S. C. MIDLAM.
Pumps.

No. 154,991. Patented Sept. 15, 1874.

Witnesses. Inventor.

UNITED STATES PATENT OFFICE.

S. CORNELIUS MIDLAM, OF ALBANY, NEW YORK.

IMPROVEMENT IN PUMPS.

Specification forming part of Letters Patent No. 154,991, dated September 15, 1874; application filed June 20, 1874.

*To all whom it may concern:*

Be it known that I, S. CORNELIUS MIDLAM, of the city and county of Albany and State of New York, have invented an Improvement on Pumps, of which the following is a full and exact description, reference being had to the accompanying drawing making a part of this specification, in which—

Figure 1:
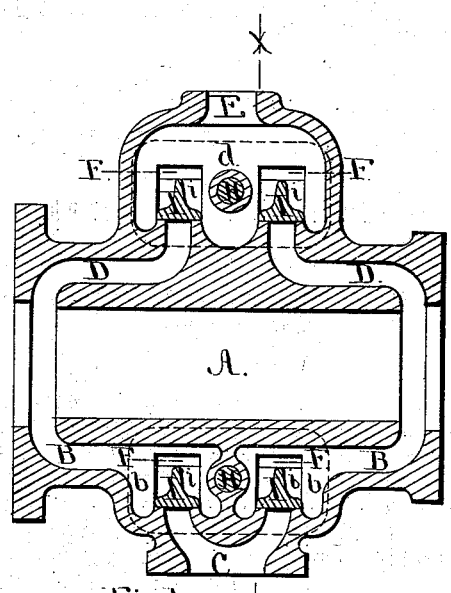
Figure 3:
Figure 2:
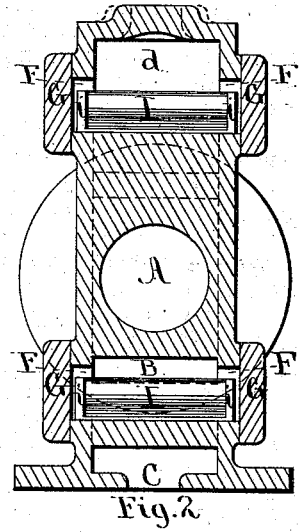
Figure 4:
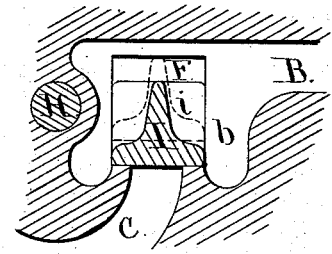

Figure 1 is a longitudinal section; Fig. 2, a transverse section at the line $x\ x$; and Figs. 3 and 4 are enlarged and detached views of one of the valves.

My invention relates to the construction and arrangement of the valves, valve-chambers, and ports of reciprocating pumps, as herein shown and described, whereby I am enabled to produce a prompt and perfect action of the valves without having recourse to the use of springs commonly employed to effect such action.

As shown in the drawing, A is the cylinder of the pump, which is provided with the induction-ports B B, each of which has a valve-chamber, $b\ b$, made in the form shown, and which communicate through the valve-passages with the induction-opening C. D D are the eduction-ports leading into the valve-chamber $d$, which is made in the form shown in the drawings, and terminates in the discharge-opening E. The openings F pass through both side walls of the valve-chambers, for the purpose of obtaining access to the valves. They are covered by the cap-plates G, each pair of which is secured by a bolt, H, passing through a sleeve cast in each valve-chamber. The valves I have a cross-section of the peculiar form shown in the drawing, and are provided with a flange, $i$, at each end, which, being retained in the valve-openings F, guides the valve during its action. The space left between the flange $i$ and the top of the openings F determines the lift of the valve.

By making the valves I in the form shown, the currents of water converge over their apexes, and by the pressure imparted thereby the valves are forced down to their seats, this action being greatly aided and enhanced by the form of the valve-chambers shown.

It will readily be seen that this converging action of the water over a valve having a rectangular cross-section would create a partial vacuum over it, thereby retarding its return to its seat, and requiring, to effect its proper action, the employment of springs placed over them, as commonly used for that purpose. To remedy this defect, which is one well known and appreciated among practical men, is the object of my invention.

I claim as my invention—

The cylinder A, having valve-chambers $b$ and $d$, in combination with the valve I, having the tapering projection at its back, substantially as and for the purpose set forth.

S. CORNELIUS MIDLAM.

Witnesses:
WILLIAM H. LOW,
HENRY C. HASKELL.